United States Patent Office 2,916,518
Patented Dec. 8, 1959

2,916,518

PHOSPHINE BORINE COMPOUNDS AND THEIR PREPARATION

Anton B. Burg, Los Angeles, and Ross I. Wagner, Montebello, Calif., assignors to The University of Southern California, a corporation of California No Drawing. Application June 17, 1957
Serial No. 666,207

10 Claims. (Cl. 260—606.5)

This invention which is a continuation-in-part of our copending application, Serial No. 446,148, filed July 27, 1954, now abandoned, relates in general to phosphine borine compositions which are useful as intermediates in the preparation of phosphinoborines. Such phosphine borines may be pyrolyzed whereby to remove hydrogen atoms from both the phosphorous and boron, thus yielding the desired phosphinoborines.

The phosphine borines embraced by this invention have the general formula $RR'HP:BH_3$ where the symbols R and R' represent alkyl radicals of less than 13 carbon atoms and lower alkenyl radicals and wherein at least one of R and R' represents a radical having at least two carbon atoms. Compounds of this type, when pyrolized as set forth in our copending application Serial No. 666,205, filed even date herewith, form ring (predominantly trimeric) phosphinoborines which are liquids and find particular utility where heat-resistant hydraulic fluids are required.

It is therefore an object of this invention to provide for the preparation of phosphine borine intermediates which may be used to prepare phosphinoborines by pyrolysis.

Generally, it has been found that when a phosphine and a borine, or sources thereof, are placed in a reaction vessel in contact with one another and the temperature conditions are properly adjusted, an addition reaction occurs between these two ingredients whereby to form a phosphine borine addition product.

More particularly, it has been found that phosphine borines may be obtained from appropriate phosphines and borines by an addition reaction in the absence of moisture and in a non-oxidizing atmosphere. To aid in insuring these conditions, the reaction vessel should be flushed with nitrogen or similar inert gas or be evacuated before the reactants are introduced.

Under ordinary circumstances, the reaction is exothermic and tends to occur vigorously. The vigor of the reaction may be at least partially controlled by the use of suitable external cooling (Dry Ice and liquid nitrogen are effective coolants), by use of suitable diluents which serve to prevent the temperature of the reaction from becoming unduly high and which may act as the solvent medium for the reaction, or by using both external cooling and a diluent.

The reactor should be formed of a material which will resist the corrosive effects of the reaction and have sufficient strength to withstand temperatures and pressures that may obtain during the reaction. Where the process is carried out on a small scale, a heat resistant glass is suitable for use as a reactor.

The products of this invention are phosphine borine materials of the type $RR'HP:BH_3$ where R and R' are certain alkyl radicals of less than 13 carbon atoms and lower alkenyl radicals. As set forth in our aforementioned copending application, filed even date herewith, it is essential that the phosphine borines which are to be converted into phosphinoborines by the pyrolysis route contain only hydrogen atoms on the boron. When a phosphine borine having one or more hydrocarbon radicals on the boron atom is pyrolyzed, disproportionation occurs, changing the phosphine borine initially present to a phosphine trialkyl borine, among other things, which cannot be converted to the useful phosphinoborine. This occurs at temperatures below those required for the loss of hydrogen from the phosphine boring reactant. Therefore a portion of the reactant is lost where a material having radicals other than merely hydrogen bonded to the boron is pyrolyzed. In addition, a mixture of products is secured under such circumstances and control over the course of the action is lost.

It is also essential that a single hydrogen, and a single hydrogen only, be bonded to the phosphorous if the phosphine borine is to be pyrolyzed to form a phosphinoborine. If no hydrogens are present initially, none can be lost and the phosphinoborine will not be formed. But where more than a single hydrogen is bonded to the phosphorous, and such material is pyrolyzed, these extra hydrogens will be driven off and a highly cross-linked and unusable polymer will be obtained.

Various examples of the process of this invention are set forth below by way of illustration but are not to be construed as placing limitations on the scope of the invention other than as are set out in the claims.

Example I

Methylethylphosphine, $CH_3(C_2H_5)PH$ in the amount of 6.84 g. was placed in 300 ml. round bottom flask which had been previously evacuated and externally cooled to $-78°$ C. by means of solid carbon dioxide. Diborane, $B_2H_6$, in the amount of 1.24 g. was passed into the flask. As the addition of the diborane continued, the temperature increased somewhat and the final temperature reached $0°$ C. A quantitative yield of methylethylphosphine borine, $CH_3(C_2H_5)HP:BH_3$, melting below $-78°$ C. was secured. The compound is a colorless liquid.

Example II

A 300 ml. flask was flushed with nitrogen and fitted with a distilling head and an addition funnel in which nitrogen was also maintained. 200 ml. diethyl ether were added to the flask followed by 21.32 g. diethylphosphine, $(C_2H_5)_2PH$, through the addition funnel. The flask had been cooled to $-20°$ C. by external application thereto of Dry Ice preceding the addition of the aforementioned materials. Thereafter, 4.81 g. diborane were passed into the flask through the addition funnel. As the diborane was added, the temperature was allowed to warm slightly so that $0°$ C. was reached at the conclusion of the diborane addition. A 95% yield of the diethylphosphine borine was secured following the removal of the solvent by distillation at a reduced pressure. The reaction product has the formula $(C_2H_5)_2HP:BH_3$.

Example III

Into a 300 ml. bulb maintained at $-196°$ C. in liquid nitrogen were distilled 9.641 moles of methyl-i-propylphosphine and 4.818 moles diborane. Upon warming to $-78°$ C. a vigorous reaction occurred forming the liquid addition compound, methyl-i-propylphosphine borine from which the excess $B_2H_6$ was removed under vacuum. The product, $CH_3(i-C_3H_7)HP:BH_3$, melting below $-78°$ C. was obtained in quantitative yield.

Example IV

Dodecylmethylphosphine, $C_{12}H_{25}(CH_3)PH$ in the amount of 12.96 g. was placed in a 300 ml. round bottom flask which had previously been evacuated. 0.83 g. diborane was thereafter passed into a flask while the latter was maintained at $-78°$ C. by means of solid carbon dioxide. Thereafter, the temperature of the mixture was allowed to increase until the reaction began and the temperature maintained at substantially this level until all of the diborane had reacted. A quantitative yield of the dodecylmethylphosphine borine, $$C_{12}H_{25}(CH_3)HP:BH_3$$

was thus obtained.

*Example V*

A 250 ml. round bottom flask was fitted with an extended neck consisting of a water condenser, a gas inlet tube extending to the bottom of the flask and a gas outlet tube. Into the reaction vessel was distilled 29.4 g. of methyl-i-propylphosphine and 25.0 g. of methylethylphosphine. The reaction flask was immersed in a Dry Ice slurry at −78° C. and a mixture of diborane and nitrogen gas bubbled into the mixed phosphines until diborane appeared in the excess gas, which passed through a mercury bubbler and into a Bunsen burner. The apparatus was swept with nitrogen to remove excess diborane yielding a mixture of addition compounds, i.e., methylethylphosphine borine and methyl-i-propylphosphine borine.

The stoichiometry for and additional information regarding further runs wherein a phosphine may be reacted with diborane to produce a phosphine borine addition product are set forth in the table below.

| Example No. | Phosphine | Grams | Grams Diborane | Approx. Reax. Temp., °C. | Phosphine Borine Product |
|---|---|---|---|---|---|
| VI | n-C$_4$H$_9$(CH$_3$)PH | 1.25 | 0.162 | −78 | n-C$_4$H$_9$(CH$_3$)HP:BH$_3$. |
| VII | (n-C$_5$H$_{11}$)$_2$PH | 11.33 | 1.52 | 0 | (n-C$_5$H$_{11}$)$_2$HP:BH$_3$. |
| VIII | n-C$_6$H$_{13}$(CH$_3$)PH | 9.23 | 0.97 | −70 | n-C$_6$H$_{13}$(CH$_3$)HP:BH$_3$. |
| IX | C$_7$H$_{15}$(C$_2$H$_5$)PH | 9.92 | 1.38 | −70 | C$_7$H$_{15}$(C$_2$H$_5$)HP:BH$_3$. |
| X | C$_8$H$_{17}$(CH$_3$)PH | 1.04 | 0.091 | −60 | C$_8$H$_{17}$(CH$_3$)HP:BH$_3$. |
| XI | CH$_2$=CHCH$_2$(C$_2$H$_5$)PH | 1.10 | 0.152 | 0 | CH$_2$=CHCH$_2$(C$_2$H$_5$)HP:BH$_3$. |
| XII | (C$_6$H$_{13}$)$_2$PH | 1.616 | 0.115 | −78 | (C$_6$H$_{13}$)$_2$HP:BH$_3$. |
| XIII | (C$_8$H$_{17}$)$_2$PH | 21.6 | 2.77 | −20 | (C$_8$H$_{17}$)$_2$HP:BH$_3$. |
| XIV | CH$_3$CH=CHCH$_2$(C$_2$H$_5$)HP | 12.76 | 1.52 | −30 | CH$_3$CH=CHCH$_2$(C$_2$H$_5$)HP:BH$_3$. |
| XV | (n-C$_3$H$_7$)$_2$PH | 0.675 | 0.126 | −78 | (n-C$_3$H$_7$)$_2$HP:BH$_3$. |

As can be seen from the foregoing, it is possible to make a wide variety of phosphine borines by following the teachings of this invention. All of the materials described herein are included within the scope of the general formula RR′HP:BH$_3$ where R and R′ are alkyl radicals of less than 13 carbon atoms and lower alkenyl radicals and where at least one of R or R′ contains at least two carbons. Thus the most elementary compound falling within the scope of this invention is that set forth in Example I, CH$_3$(C$_2$H$_5$)HP:BH$_3$. This material may be pyrolyzed as set forth in our copending application, Serial No. 446,147, filed July 27, 1954, and in application Serial No. 666,205, filed June 17, 1957, to yield phosphinoborines which are ring polymers and which are liquids at ordinary temperatures—therefore finding utility as hydraulic fluids and dielectrics under conditions where extremely stable materials are necessitated.

A divisional application of the aforementioned application Serial No. 446,147, which is identified as Serial No. 754,914, filed August 14, 1958, describes and claims compounds of the type into which the phosphine borines of this invention may be converted.

As set out earlier, another essential feature of this invention is the provision that three hydrogens must be bonded to the boron and a single hydrogen to the phosphorous. Where materials other than hydrogen are bonded to the boron, the aforementioned disproportionation occurs at temperatures below those required for the loss of hydrogen from both boron and phosphorous to form a phosphinoborine. Where more than a single hydrogen is bonded to the phosphorous, the compound will lose more than a single hydrogen from such phosphorous on pyrolysis with the result that a highly cross-linked glassy material will be secured.

Obviously many modifications and variations of the invention as hereinbefore set forth may be made without departing from the spirit and scope thereof, and therefore only such limitations should be imposed as are indicated in the appended claims.

We claim:

1. A phosphine borine having the formula RR′HP:BH$_3$ where R and R′ are selected from the group consisting of alkyl radicals having less than 13 carbon atoms and lower alkenyl radicals and where at least one of R and R′ includes at least two carbon atoms.
2. Methylethylphosphine borine.
3. Methyl-i-propylphosphine borine.
4. Diethylphosphine borine.
5. Di-i-propylphosphine borine.
6. Hexylmethylphosphine borine.
7. A phosphine borine having the formula $$R(CH_3)HP:BH_3$$

wherein R is an alkyl group having at least 2 and less than 13 carbon atoms.

8. A phosphine borine having the formula $$R(C_2H_5)HP:BH_3$$

wherein R is an alkyl group having less than 13 carbon atoms.

9. A phosphine borine having the formula $$R(C_3H_7)HP:BH_3$$

wherein R is an alkyl group having less than 13 carbon atoms.

10. Dodecylmethylphosphine borine.

References Cited in the file of this patent

Burg et al.: "Amer. Chem. Soc. Jour.," vol. 75, pp. 3872–7 (1953).

Hewitt et al.: "J. Chem. Soc." (London), pp. 530–4 (1953), publ. February 1953; received in Patent Office Library April 1, 1953.

UNITED STATES PATENT OFFICE

CERTIFICATE OF CORRECTION

Patent No. 2,916,518            December 8, 1959

Anton B. Burg et al.

It is hereby certified that error appears in the above numbered patent requiring correction and that the said Letters Patent should read as corrected below.

In the grant, lines 2 and 3, for "assignors to The University of Southern California, a corporation of California," read -- assignors, by mesne assignments, to American Potash & Chemical Corporation, a corporation of Delaware,--; line 12, for "The University of Southern California, its successors" read --American Potash & Chemical Corporation, its successors--; in the heading to the printed specification, lines 5 and 6, for "assignors to The University of Southern California, a corporation of California" read -- assignors, by mesne assignments, to American Potash & Chemical Corporation, a corporation of Delaware --.

Signed and sealed this 5th day of July 1960.

(SEAL)
Attest:

KARL H. AXLINE                          ROBERT C. WATSON
Attesting Officer                    Commissioner of Patents